(12) United States Patent
Sato et al.

(10) Patent No.: US 12,211,255 B2
(45) Date of Patent: Jan. 28, 2025

(54) ADDITIONAL PHOTOGRAPHING NECESSITY/UNNECESSITY NOTIFYING APPARATUS, ADDITIONAL PHOTOGRAPHING NECESSITY/UNNECESSITY NOTIFYING METHOD, AND PROGRAM

(71) Applicant: Sony Interactive Entertainment Inc., Tokyo (JP)

(72) Inventors: Shogo Sato, Tokyo (JP); Hiroyuki Segawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 190 days.

(21) Appl. No.: 18/001,804

(22) PCT Filed: Jul. 3, 2020

(86) PCT No.: PCT/JP2020/026263
§ 371 (c)(1),
(2) Date: Dec. 14, 2022

(87) PCT Pub. No.: WO2022/003974
PCT Pub. Date: Jan. 6, 2022

(65) Prior Publication Data
US 2023/0222774 A1 Jul. 13, 2023

(51) Int. Cl.
*G06T 19/00* (2011.01)
*G06V 10/764* (2022.01)
*G06V 10/774* (2022.01)

(52) U.S. Cl.
CPC .......... *G06V 10/774* (2022.01); *G06T 19/006* (2013.01); *G06V 10/764* (2022.01)

(58) Field of Classification Search
CPC ........ G06T 2207/20081; G06N 3/0475; G06V 10/774; G06V 10/764
See application file for complete search history.

(56) References Cited

U.S. PATENT DOCUMENTS 9,602,783 B2 3/2017 Sugishita
10,529,103 B2 * 1/2020 Nomoto ............... G06V 10/462
(Continued)

FOREIGN PATENT DOCUMENTS

JP 2005208850 A 8/2005
JP 2015191426 A 11/2015
(Continued)

OTHER PUBLICATIONS

International Search Report for corresponding PCT Application No. PCT/JP2020/026263, 5 pages, Sep. 15, 2020.

*Primary Examiner* — Antonio A Caschera
(74) *Attorney, Agent, or Firm* — Kilpatrick Townsend & Stockton LLP

(57) ABSTRACT

A sample image obtaining section repetitively obtains a sample image generated by photographing a given sample by a photographing unit. A feature quantity extracting section generates feature quantity data corresponding to the sample image, in reference to the sample image. The feature quantity extracting section classifies each of a plurality of pieces of feature quantity data into either training data or evaluation data. An evaluation learning section performs learning of an evaluation discriminator by using a plurality of pieces of the training data. A photographing necessity/unnecessity determining section determines necessity/unnecessity of additional photographing of the sample by using the evaluation discriminator in which the learning using the plurality of pieces of the training data has already been performed and a plurality of pieces of the evaluation data. A notifying section gives a notification regarding a result of the determination of the necessity/unnecessity of additional photographing of the sample.

6 Claims, 18 Drawing Sheets

(56) References Cited

U.S. PATENT DOCUMENTS

| | | | |
|---|---|---|---|
| 11,308,367 B2 | 4/2022 | Ono | |
| 2003/0088532 A1* | 5/2003 | Hampshire, II | G06N 3/08 706/16 |
| 2015/0363670 A1 | 12/2015 | Sugishita | |
| 2019/0188543 A1* | 6/2019 | Tamai | G06F 18/40 |
| 2021/0064912 A1 | 3/2021 | Ono | |

FOREIGN PATENT DOCUMENTS

| | | | |
|---|---|---|---|
| JP | 2016015116 A | | 1/2016 |
| JP | 2019079167 A | * | 5/2019 |
| WO | 2019146057 A1 | | 8/2019 |

* cited by examiner

F I G . 1
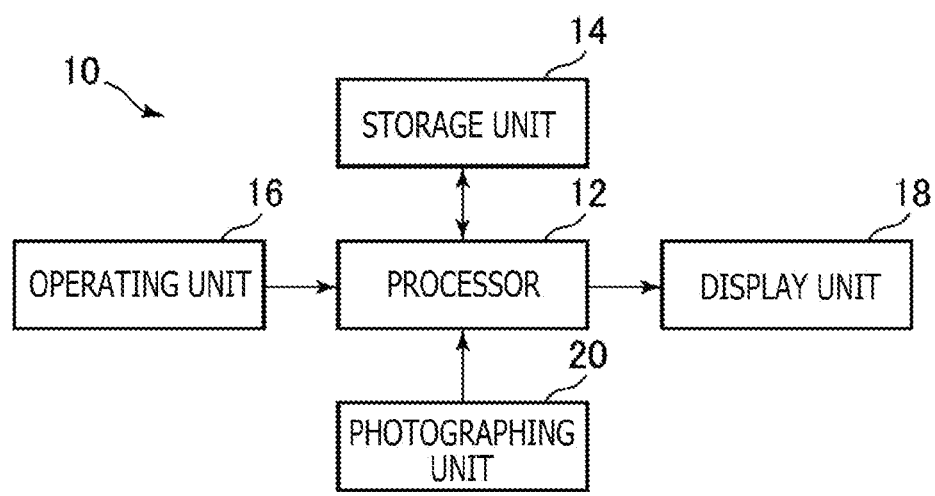

| REGION ID | SAMPLE COUNT DATA | ADDITIONAL PHOTOGRAPHING NECESSITY/UNNECESSITY DATA |
|---|---|---|
| 1 | 3 | 0 |

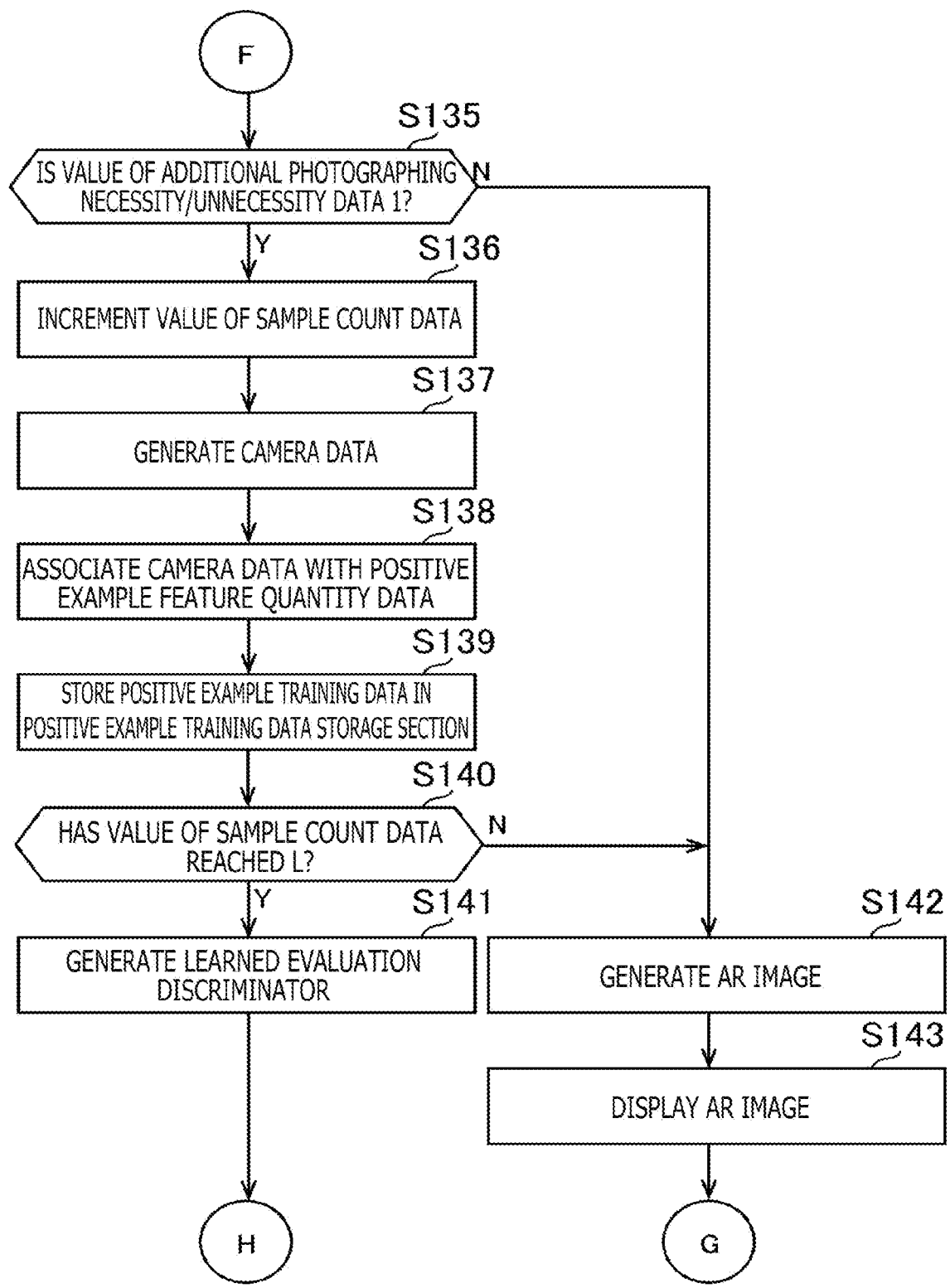

ADDITIONAL PHOTOGRAPHING NECESSITY/UNNECESSITY NOTIFYING APPARATUS, ADDITIONAL PHOTOGRAPHING NECESSITY/UNNECESSITY NOTIFYING METHOD, AND PROGRAM

TECHNICAL FIELD

The present invention relates to an additional photographing necessity/unnecessity notifying apparatus, an additional photographing necessity/unnecessity notifying method, and a program.

BACKGROUND ART

In order to generate a discriminator having a high discrimination accuracy, it is necessary to collect a sufficient number of pieces of training data to be used as positive examples and negative examples, and make the discriminator learn these pieces of training data. Accordingly, in order to collect the training data to be used for the learning of the discriminator, the training data is generated in reference to each of a plurality of sample images obtained by photographing a given sample from various postures.

SUMMARY

Technical Problem

However, with a conventional technology, a user is not notified of whether sufficient photographing for ensuring a discrimination accuracy of the discriminator has been performed, when the user performs the photographing of the sample for generating the training data. Hence, with the conventional technology, the user cannot determine whether the user may end the photographing. As a result, efficiency of collection of the training data is degraded.

The present invention has been made in view of the above-described actual situation. It is an object of the present invention to provide an additional photographing necessity/unnecessity notifying apparatus, an additional photographing necessity/unnecessity notifying method, and a program that can enhance efficiency of collection of training data.

Solution to Problem

In order to solve the above problem, an additional photographing necessity/unnecessity notifying apparatus according to the present invention includes a sample image obtaining section configured to repetitively obtain a sample image generated by photographing a given sample by a photographing unit, a feature quantity data generating section configured to generate feature quantity data corresponding to the sample image, in reference to the sample image, a classifying section configured to classify each of a plurality of pieces of the feature quantity data into either training data or evaluation data, a learning section configured to perform learning of a discriminator by using a plurality of pieces of the training data, a photographing necessity/unnecessity determining section configured to determine necessity/unnecessity of additional photographing of the sample by using the discriminator in which the learning using the plurality of pieces of the training data has already been performed and a plurality of pieces of the evaluation data, and a notifying section configured to give a notification regarding a result of the determination of the necessity/unnecessity.

In one aspect of the present invention, for each of a plurality of photographing posture ranges with respect to the sample determined in advance, the photographing necessity/unnecessity determining section determines the necessity/unnecessity of additional photographing of the sample in the respective photographing posture range by using the evaluation data corresponding to the sample image photographed in the photographing posture range, and the notifying section gives a notification regarding results of the determination of the necessity/unnecessity in the plurality of the photographing posture ranges.

In this aspect, in reference to a sample image photographed additionally in a photographing posture range for which additional photographing of the sample has been determined to be necessary, the feature quantity data generating section may generate additional training data as feature quantity data corresponding to the sample image, and the learning section may update the discriminator by performing learning using the additional training data.

Further, the additional photographing necessity/unnecessity notifying apparatus may repeat the generation of the additional training data by the feature quantity data generating section, the updating of the discriminator by the learning section, and the determination of the necessity/unnecessity of additional photographing of the sample by the photographing necessity/unnecessity determining section until the additional photographing of the sample is determined to be unnecessary.

In addition, further included may be a virtual space generating section configured to generate a virtual space in which a virtual object is disposed, the virtual object representing the result of the determination of the necessity/unnecessity for each of the plurality of the photographing posture ranges, and an augmented reality (AR) image generating section configured to generate an AR image obtained by superimposing on each other the sample image and an image representing a view in a direction in the virtual space, the direction corresponding to a photographing direction of the sample image, from a position within the virtual space, the position corresponding to a photographing position of the sample image, and the notifying section may cause the AR image to be displayed on a screen.

In addition, an additional photographing necessity/unnecessity notifying method according to the present invention includes a step of repetitively obtaining a sample image generated by photographing a given sample by a photographing unit, a step of generating feature quantity data corresponding to the sample image, in reference to the sample image, a step of classifying each of a plurality of pieces of the feature quantity data into either training data or evaluation data, a step of performing learning of a discriminator by using a plurality of pieces of the training data, a step of determining necessity/unnecessity of additional photographing of the sample by using the discriminator in which the learning using the plurality of pieces of the training data has already been performed and a plurality of pieces of the evaluation data, and a step of giving a notification regarding a result of the determination of the necessity/unnecessity.

In addition, a program according to the present invention makes a computer perform a step of repetitively obtaining a sample image generated by photographing a given sample by a photographing unit, a step of generating feature quantity data corresponding to the sample image, in reference to the sample image, a step of classifying each of a plurality of pieces of the feature quantity data into either training data or evaluation data, a step of performing learning of a discriminator by using a plurality of pieces of the training data, a step of determining necessity/unnecessity of additional photographing of the sample by using the discriminator in which the learning using the plurality of pieces of the training data has already been performed and a plurality of pieces of the evaluation data, and a step of giving a notification regarding a result of the determination of the necessity/unnecessity.

BRIEF DESCRIPTION OF DRAWINGS

FIG. 1 is a diagram illustrating an example of a configuration of an information processing apparatus according to one embodiment of the present invention.

FIG. 12F is a flowchart illustrating an example of a flow of processing performed in the information processing apparatus according to one embodiment of the present invention.

DESCRIPTION OF EMBODIMENT

Figure 2:
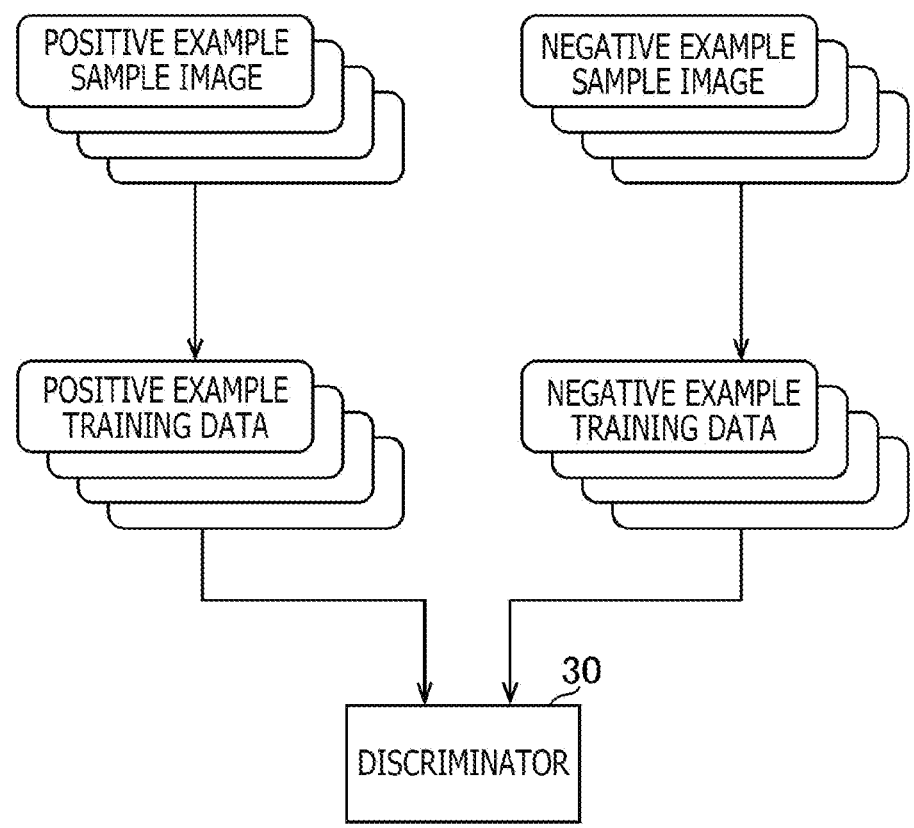
FIG. 2 is a diagram illustrating an example of the learning of a discriminator in one embodiment of the present invention.

One embodiment of the present invention will hereinafter be described in detail with reference to the drawings.

FIG. 1 is a diagram illustrating an example of a configuration of an information processing apparatus 10 according to one embodiment of the present invention. The information processing apparatus 10 according to the present embodiment is, for example, a computer such as a game console or a personal computer. As illustrated in FIG. 1, the information processing apparatus 10 according to the present embodiment includes, for example, a processor 12, a storage unit 14, an operating unit 16, a display unit 18, and a photographing unit 20.

The processor 12 is, for example, a program-controlled device such as a central processing unit (CPU) that operates according to a program installed on the information processing apparatus 10.

The storage unit 14 is a storage element such as a read only memory (ROM) or a random access memory (RAM), a solid-state drive, or the like. The storage unit 14 stores the program executed by the processor 12 and the like.

The operating unit 16 is a user interface such as a keyboard, a mouse, or a controller of a game console. The operating unit 16 receives operating input of a user, and outputs a signal indicating the content of the operating input to the processor 12.

The display unit 18 is a display device such as a liquid crystal display. The display unit 18 displays various kinds of images according to instructions of the processor 12.

The photographing unit 20 is a photographing device such as a digital camera. Suppose that the photographing unit 20 according to the present embodiment is a video camera capable of photographing a moving image.

Incidentally, the information processing apparatus 10 may include an audio input-output device such as a microphone and a speaker. In addition, the information processing apparatus 10 may include a communication interface such as a network board, an optical disk drive that reads an optical disk such as a digital versatile disc (DVD)-ROM or a Blu-ray (registered trademark) disk, a universal serial bus (USB) port, or the like.

As illustrated in FIG. 2, the present embodiment generates a discriminator 30 (learned discriminator 30) such as a support vector machine (SVM) that has learned by using a plurality of pieces of positive example training data as positive examples and a plurality of pieces of negative example training data as negative examples. Each of the plurality of pieces of positive example training data is, for example, generated in reference to a sample image depicting an object belonging to a positive class in the discriminator 30 (the sample image will hereinafter be referred to as a positive example sample image). In addition, each of the plurality of pieces of negative example training data is, for example, generated in reference to a sample image depicting an object belonging to a negative class in the discriminator 30 (the sample image will hereinafter be referred to as a negative example sample image).

Figure 3:
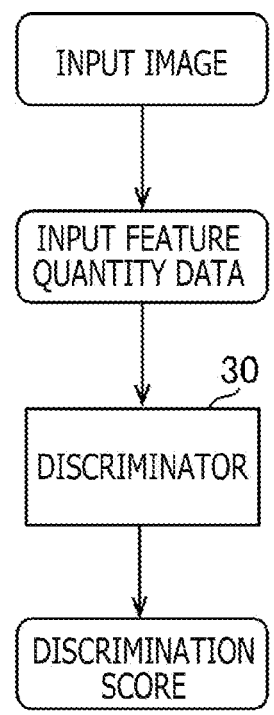
FIG. 3 is a diagram illustrating an example of discrimination using a learned discriminator in one embodiment of the present invention.

Then, as illustrated in FIG. 3, in response to input of input feature quantity data indicating a feature quantity corresponding to an input image, the learned discriminator 30 outputs a discrimination score indicating the probability that an object appearing in the input image belongs to the positive class in the discriminator 30.

The information processing apparatus 10 according to the present embodiment stores, for example, an already learned regional proposal network (RPN) in advance. Then, in the present embodiment, a region in which some kind of object is estimated to appear is extracted from a sample image with use of the RPN. This processing can reduce inefficiency of calculation, and can ensure a certain degree of robustness also against an environment.

Then, such normalization processing as background removal processing (mask processing), for example, is performed on the image of the extracted region. This processing can reduce a domain gap caused by a background and an illumination condition. As a result, the learning of the discriminator 30 can be completed even by only data collected under a limited environment.

In addition, the information processing apparatus 10 according to the present embodiment stores a convolutional neural network (CNN) in which metric learning has already been performed in advance. This CNN outputs feature quantity data indicating a feature quantity corresponding to an image in response to input of the image. This CNN is tuned to output feature quantity data indicating feature quantities close to each other for images depicting an object belonging to the positive class by the advance metric learning. The feature quantities indicated by the feature quantity data according to the present embodiment are, for example, a vector quantity normalized such that the norm is 1.

By using this CNN, the present embodiment generates feature quantity data indicating a feature quantity corresponding to the image on which the normalization processing has been performed. When the CNN in which metric learning has already been performed in advance is used, feature quantities of samples belonging to one class are integrated in a compact region regardless of conditions. As a result, the information processing apparatus 10 according to the present embodiment can determine an appropriate discrimination boundary in the discriminator 30 even from a small number of samples.

In the present embodiment, feature quantity data indicating a feature quantity corresponding to a positive example sample image is generated by input of an image obtained by performance of the normalization processing on an image of a region extracted from the positive example sample image by the RPN to the CNN in which metric learning has already been performed. The feature quantity data thus generated from the positive example sample image corresponds to positive example training data illustrated in FIG. 2.

In addition, in the present embodiment, feature quantity data indicating a feature quantity corresponding to a negative example sample image is generated by input of an image obtained by performance of the normalization processing on an image of a region extracted by the RPN from the negative example sample image to the CNN in which metric learning has already been performed. The feature quantity data thus generated from the negative example sample image corresponds to negative example training data illustrated in FIG. 2.

In the present embodiment, also for an input image as a target for estimating an object appearing therein, input feature quantity data corresponding to the input image is similarly generated by the region extraction, the normalization processing, and the generation of the feature quantity data with use of the CNN in which metric learning has already been performed, as described above. Further, when the input feature quantity data thus generated is input to the learned discriminator 30, the learned discriminator 30 outputs a discrimination score indicating the probability that the object appearing in the input image belongs to the positive class.

In order to generate a discriminator 30 having a high discrimination accuracy, it is necessary to collect a sufficient number of pieces of training data to be used as positive examples and negative examples, and make the discriminator 30 learn these pieces of training data. Accordingly, in order to collect training data to be used for the learning of the discriminator 30, a plurality of sample images are generated by photographing a given sample from various postures, and the training data is generated in reference to each of these sample images.

The present embodiment can improve efficiency of collection of the training data by notifying the user of whether sufficient samples for ensuring a discrimination accuracy of the discriminator 30 have been photographed, as follows.

In the following, description will be made of functions implemented by the information processing apparatus 10 according to the present embodiment and processing performed by the information processing apparatus 10 according to the present embodiment.

Figure 4A:
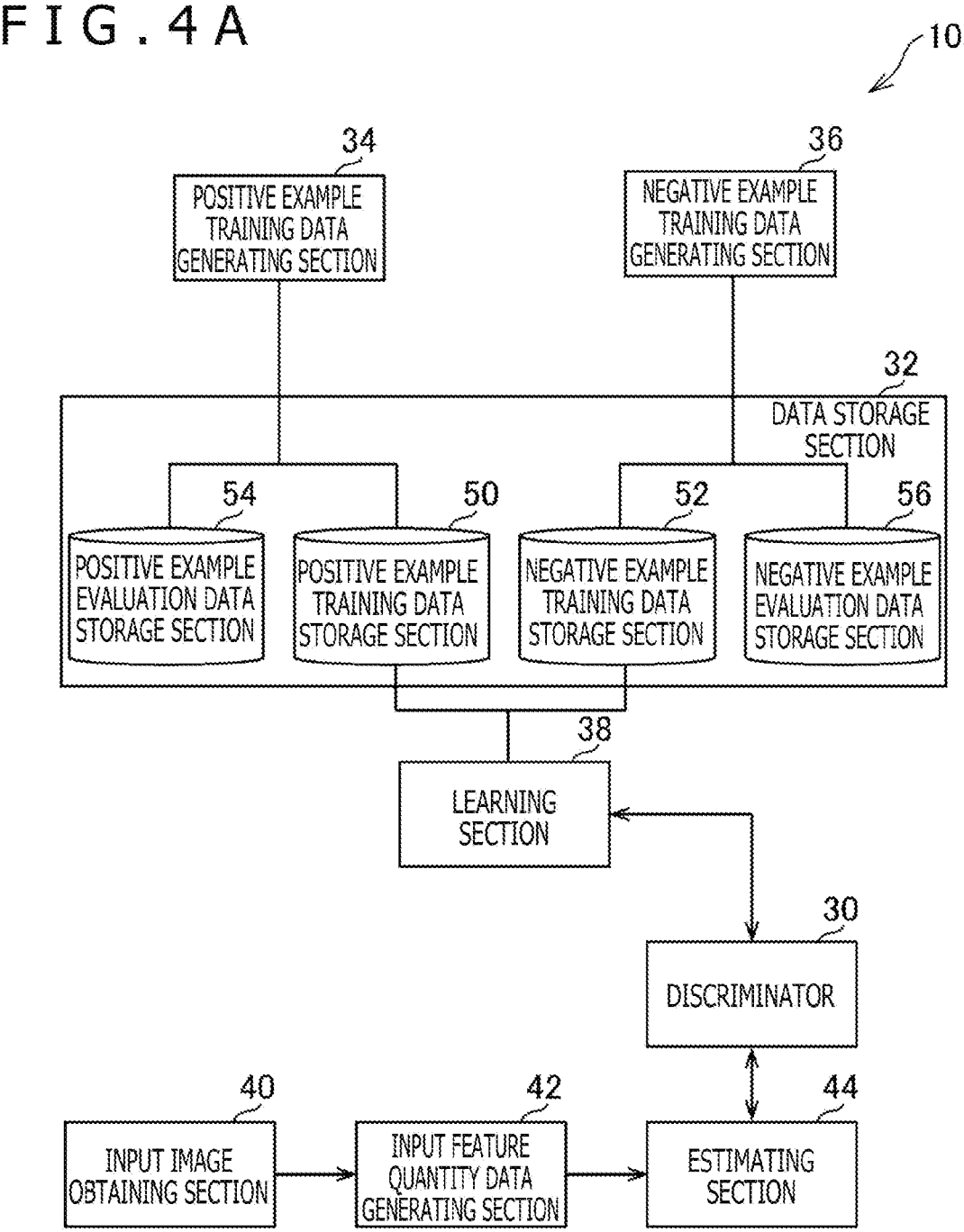
FIG. 4A is a functional block diagram illustrating an example of functions implemented by the information processing apparatus according to one embodiment of the present invention.
Figure 4B:
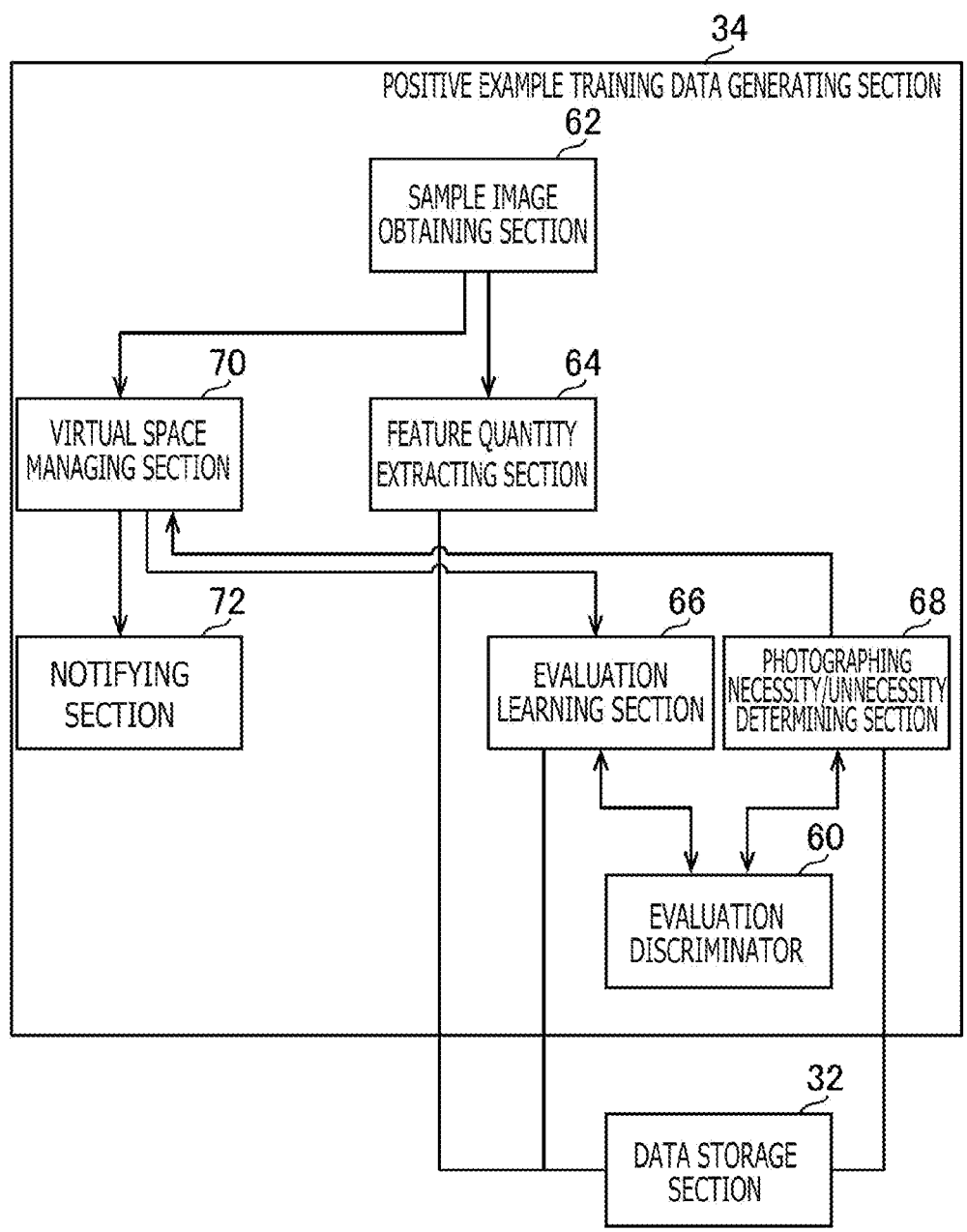
FIG. 4B is a functional block diagram illustrating an example of functions implemented by the information processing apparatus according to one embodiment of the present invention.
Figure 4C:
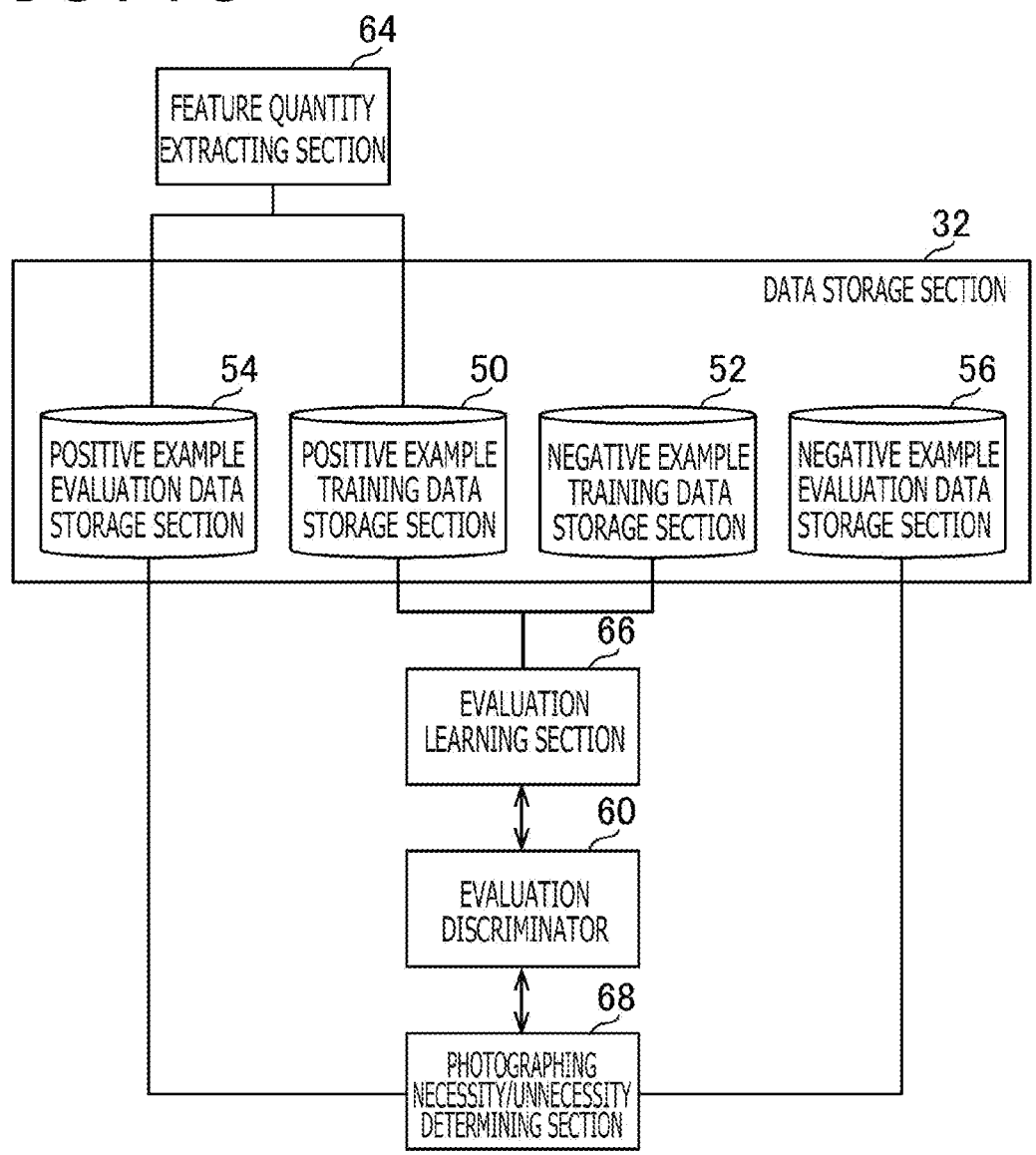
FIG. 4C is a functional block diagram illustrating an example of functions implemented by the information processing apparatus according to one embodiment of the present invention.

FIG. 4A, FIG. 4B, and FIG. 4C are functional block diagrams illustrating an example of functions implemented by the information processing apparatus 10 according to the present embodiment. Incidentally, the information processing apparatus 10 according to the present embodiment does not need to implement all of the functions illustrated in FIG. 4A, FIG. 4B, and FIG. 4C, and may implement functions other than the functions illustrated in FIG. 4A, FIG. 4B, and FIG. 4C.

As illustrated in FIG. 4A, the information processing apparatus 10 according to the present embodiment functionally includes, for example, a discriminator 30, a data storage section 32, a positive example training data generating section 34, a negative example training data generating section 36, a learning section 38, an input image obtaining section 40, an input feature quantity data generating section 42, and an estimating section 44.

Further, the data storage section 32 includes a positive example training data storage section 50, a negative example training data storage section 52, a positive example evaluation data storage section 54, and a negative example evaluation data storage section 56.

FIG. 4B illustrates details of functions implemented by the positive example training data generating section 34 illustrated in FIG. 4A. As illustrated in FIG. 4B, the positive example training data generating section 34 functionally includes, for example, an evaluation discriminator 60, a sample image obtaining section 62, a feature quantity extracting section 64, an evaluation learning section 66, a photographing necessity/unnecessity determining section 68, a virtual space managing section 70, and a notifying section 72.

FIG. 4C illustrates a relation between the elements included in the data storage section 32 and the feature quantity extracting section 64, the evaluation learning section 66, and the photographing necessity/unnecessity determining section 68 illustrated in FIG. 4B.

The positive example training data storage section 50, the negative example training data storage section 52, the positive example evaluation data storage section 54, and the negative example evaluation data storage section 56 are implemented mainly by the storage unit 14. The discriminator 30, the evaluation discriminator 60, and the virtual space managing section 70 are implemented mainly by the processor 12 and the storage unit 14. The input image obtaining section 40 and the sample image obtaining section 62 are implemented mainly by the processor 12 and the photographing unit 20. The negative example training data generating section 36, the learning section 38, the input feature quantity data generating section 42, the estimating section 44, the feature quantity extracting section 64, the evaluation learning section 66, and the photographing necessity/unnecessity determining section 68 are implemented mainly by the processor 12. The notifying section 72 is implemented mainly by the processor 12 and the display unit 18.

The discriminator 30 in the present embodiment is, for example, a machine learning model such as a support vector machine (SVM) that discriminates whether or not an object appearing in an input image belongs to the positive class, as described with reference to FIG. 2 and FIG. 3.

The positive example training data generating section 34 in the present embodiment, for example, generates the above-described positive example training data made to be learned as positive examples by the discriminator 30.

The positive example training data generating section 34, for example, generates, for each of a plurality of positive example sample images photographed by the photographing unit 20, positive example feature quantity data as feature quantity data indicating a feature quantity corresponding to the positive example sample image. Each of these positive example sample images depicts an object belonging to the positive class in the discriminator 30. Here, the positive example feature quantity data corresponding to the positive example sample images may be generated by performance of the region extraction, the normalization processing, and the generation of the feature quantity data with use of the CNN in which metric learning has already been performed, as described above.

Further, the positive example training data generating section 34 stores a part of these pieces of positive example feature quantity data as positive example training data in the positive example training data storage section 50. In addition, the positive example training data generating section 34 stores the rest of these pieces of positive example feature quantity data as positive example evaluation data in the positive example evaluation data storage section 54. Here, for example, half of these pieces of positive example feature quantity data may be stored as positive example training data in the positive example training data storage section 50, and the rest may be stored as positive example evaluation data in the positive example evaluation data storage section 54.

The negative example training data generating section 36 in the present embodiment, for example, generates the above-described negative example training data that is made to be learned as negative examples by the discriminator 30.

In the present embodiment, negative example sample images, which are images photographed by the photographing unit 20 or images collected from the Web, for example, are stored in the information processing apparatus 10 in advance. Each of these negative example sample images depicts an object belonging to the negative class in the discriminator 30. Further, the negative example training data generating section 36 generates, for each of these negative example sample images, negative example feature quantity data as feature quantity data indicating a feature quantity corresponding to the negative example sample image. Here, the negative example feature quantity data corresponding to the negative example sample images may be generated by performance of the region extraction, the normalization processing, and the generation of the feature quantity data with use of the CNN in which metric learning has already been performed, as described above.

Further, the negative example training data generating section 36 stores a part of these pieces of negative example feature quantity data as negative example training data in the negative example training data storage section 52. In addition, the negative example training data generating section 36 stores the rest of these pieces of negative example feature quantity data as negative example evaluation data in the negative example evaluation data storage section 56. Here, for example, half of these pieces of negative example feature quantity data may be stored as negative example training data in the negative example training data storage section 52, and the rest may be stored as negative example evaluation data in the negative example evaluation data storage section 56.

The learning section 38 in the present embodiment, for example, generates the discriminator 30 (learned discriminator 30) that has been made to learn the positive example training data stored in the positive example training data storage section 50, as positive examples, and the negative example training data stored in the negative example training data storage section 52, as negative examples.

The input image obtaining section 40 in the present embodiment, for example, obtains an input image as a target for estimating an object appearing therein, the input image being photographed by the photographing unit 20.

The input feature quantity data generating section 42 in the present embodiment, for example, generates input feature quantity data indicating a feature quantity corresponding to the input image, as described above.

The estimating section 44 in the present embodiment, for example, estimates whether or not the object appearing in the input image belongs to the positive class in the discriminator 30, by inputting the input feature quantity data to the discriminator 30. Here, the estimating section 44 may, for example, identify the value of a discrimination score output from the discriminator 30 in response to the input of the input feature quantity data.

The present embodiment, for example, repetitively performs, at a predetermined frame rate, the photographing and obtainment of an input image, the generation of input feature quantity data, and the estimation of whether or not an object appearing in the input image belongs to the positive class. Thus, the present embodiment estimates, for each frame, whether or not the object appearing in the input image photographed in the frame belongs to the positive class. The present embodiment can hence realize high-speed object detection. In addition, the present embodiment enables the learning of the discriminator 30 to be performed with a small amount of data prepared by the user, and thus does not necessitate preparation of a large amount of labeled data for the learning of the discriminator 30 as in the conventional technology.

In the following, functions of the positive example training data generating section 34 will be further described. As described above, the positive example training data generating section 34 functionally includes, for example, the evaluation discriminator 60, the sample image obtaining section 62, the feature quantity extracting section 64, the evaluation learning section 66, the photographing necessity/unnecessity determining section 68, the virtual space managing section 70, and the notifying section 72.

The evaluation discriminator 60 in the present embodiment is, for example, a machine learning model such as an SVM that is used to determine whether or not sufficient photographing for ensuring a discrimination accuracy of the discriminator 30 has been performed.

Figure 5:
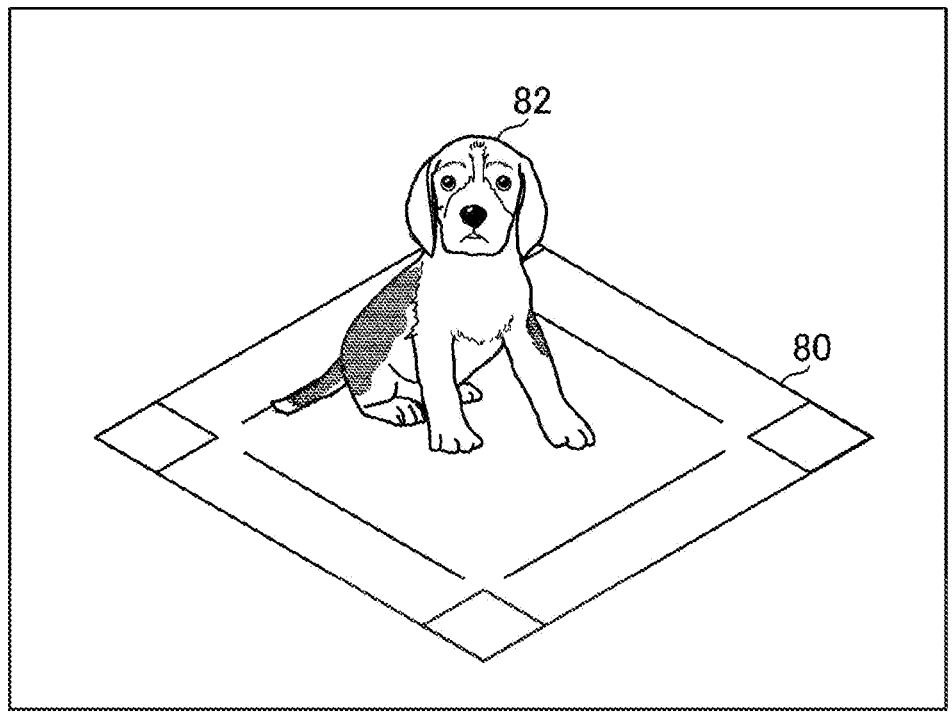
FIG. 5 is a diagram illustrating an example of a sample image.

The sample image obtaining section 62 in the present embodiment for example repetitively obtains a sample image illustrated in FIG. 5. As illustrated in FIG. 5, the sample image is an image obtained by photographing, by the photographing unit 20, a sample 82 disposed on paper printed with an AR marker 80. In the present embodiment, the user photographs a moving image in which the sample 82 is photographed from various angles, while moving the photographing unit 20. The sample image obtaining section 62 obtains frame images included in the thus photographed moving image. Suppose that the position and orientation of the sample 82 with respect to the AR marker 80 are fixed at a time of the photographing of such a moving image. In a case where the sample 82 corresponds to an object belonging to the positive class in the discriminator 30, the thus obtained sample image is a positive example sample image described above.

The feature quantity extracting section 64 in the present embodiment, for example, generates feature quantity data indicating a feature quantity corresponding to the sample image, in reference to the sample image. Here, the feature quantity data corresponding to the sample image may be generated by performance of, for the sample image, the region extraction, the normalization processing, and the generation of the feature quantity data with use of the CNN in which metric learning has already been performed, as described above.

In addition, the feature quantity extracting section 64 in the present embodiment, for example, classifies each of a plurality of pieces of generated feature quantity data into either training data or evaluation data.

As described above, in a case where positive example sample images are obtained, the feature quantity extracting section 64, for example, generates positive example feature quantity data indicating feature quantities corresponding to the positive example sample images. Further, the feature quantity extracting section 64 classifies each of a plurality of pieces of the generated positive example feature quantity data into either the positive example training data or the positive example evaluation data.

In addition, in the present embodiment, the feature quantity extracting section 64 associates camera data corresponding to the position and photographing direction of the photographing unit 20 at a time of photographing a sample image with positive example evaluation data indicating a feature quantity corresponding to the sample image. Incidentally, in the present embodiment, the positive example training data may be associated with the camera data, or may not be associated therewith.

Further, the feature quantity extracting section 64 makes the positive example training data storage section 50 store the positive example training data, and makes the positive example evaluation data storage section 54 store the positive example evaluation data.

The evaluation learning section 66 in the present embodiment, for example, performs the learning of the evaluation discriminator 60 by using a plurality of pieces of training data. Here, for example, the evaluation learning section 66 generates the evaluation discriminator 60 (learned evaluation discriminator 60) that has been made to learn the plurality of pieces of positive example training data stored in the positive example training data storage section 50, as positive examples, and the plurality of pieces of negative example training data stored in the negative example training data storage section 52, as negative examples.

The photographing necessity/unnecessity determining section 68 in the present embodiment, for example, determines the necessity/unnecessity of additional photographing of the sample 82 by using the evaluation discriminator 60 in which learning has already been performed by the evaluation learning section 66 and a plurality of pieces of evaluation data. Here, the photographing necessity/unnecessity determining section 68 may determine the discrimination accuracy of the evaluation discriminator 60 by using the evaluation discriminator 60 in which learning has already been performed by the evaluation learning section 66 and the plurality of pieces of evaluation data. Further, the photographing necessity/unnecessity determining section 68 may determine the necessity/unnecessity of additional photographing of the sample 82 according to the determined discrimination accuracy.

The photographing necessity/unnecessity determining section 68, for example, determines the necessity/unnecessity of additional photographing of the sample 82 by using the learned evaluation discriminator 60, the plurality of pieces of positive example evaluation data stored in the positive example evaluation data storage section 54, and the plurality of pieces of negative example evaluation data stored in the negative example evaluation data storage section 56.

Figure 6:
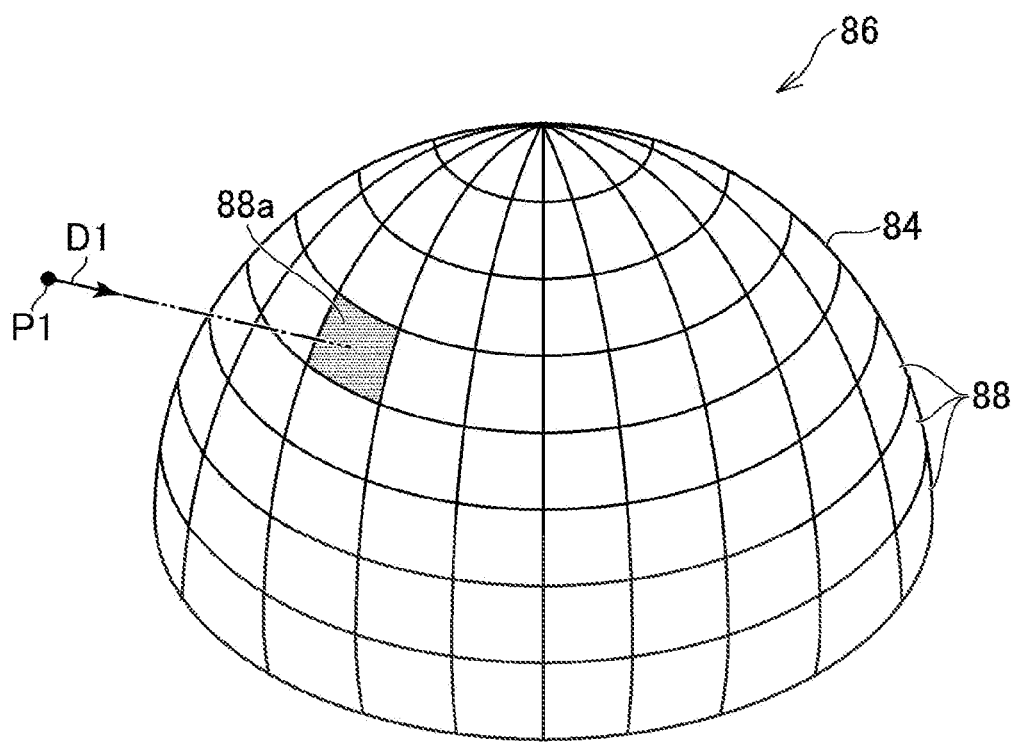
FIG. 6 is a diagram illustrating an example of a virtual space.

The virtual space managing section 70 in the present embodiment, for example, generates a virtual space 86 illustrated in FIG. 6, in which a virtual object 84 is disposed, the virtual object 84 representing a result of determination of the necessity/unnecessity of additional photographing in each of a plurality of photographing posture ranges with respect to the predetermined sample 82. As illustrated in FIG. 6, the virtual object 84 according to the present embodiment has a hemispherical shape. The virtual object 84 includes a plurality of photographing posture range objects 88 respectively corresponding to regions obtained by dividing the virtual object 84. The photographing posture range objects 88 are associated with the photographing posture ranges with respect to the sample 82.

In addition, in the present embodiment, the virtual space managing section 70 identifies a position P1 within the virtual space 86 which corresponds to the photographing position of a sample image and a direction D1 in the virtual space 86 which corresponds to the photographing direction of the sample image.

In the present embodiment, a position within the virtual space 86 and a position within a real space with respect to the position of the AR marker 80 are associated with each other on a one-to-one basis in advance, and a direction in the virtual space 86 and a direction within the real space with respect to the direction of the AR marker 80 are associated with each other on a one-to-one basis in advance. Further, according to the shape and size of the AR marker 80 appearing in the sample image, the present embodiment can identify the position P1 within the virtual space 86 which corresponds to the photographing position of the sample image and the direction D1 in the virtual space 86 which corresponds to the photographing direction of the sample image.

Incidentally, the above-described camera data associated with the positive example evaluation data by the feature quantity extracting section 64 may, for example, indicate the position P1 within the virtual space 86 and the direction D1 in the virtual space 86. In addition, the camera data may, for example, be an identifier (for example, a region identification (ID) to be described later) of a range-of-interest object 88a as a photographing posture range object 88 that intersects a line along the direction D1 which passes through the position P1. In FIG. 6, the range-of-interest object 88a is represented by dots.

Further, the virtual space managing section 70, for example, generates an AR image obtained by superimposing on each other the sample image and an image representing a view in the direction in the virtual space 86 which corresponds to the photographing direction of the sample image from the position within the virtual space 86 which corresponds to the photographing position of the sample image.

For example, suppose that the photographing position and photographing direction of the sample image illustrated in FIG. 5 are respectively associated with the position P1 and the direction D1 illustrated in FIG. 6. In this case, generated is the AR image illustrated in FIG. 7 in which an image representing a view in the direction D1 from the position P1 within the virtual space 86 and the sample image illustrated in FIG. 5 are superimposed on each other.

The notifying section 72 in the present embodiment, for example, gives a notification regarding a result of determination of the necessity/unnecessity of additional photographing of the sample 82 by, for example, display, audio output, or the like. In addition, the notifying section 72 in the present embodiment, for example, makes the display unit 18 display the AR image generated by the virtual space managing section 70.

Figure 7:
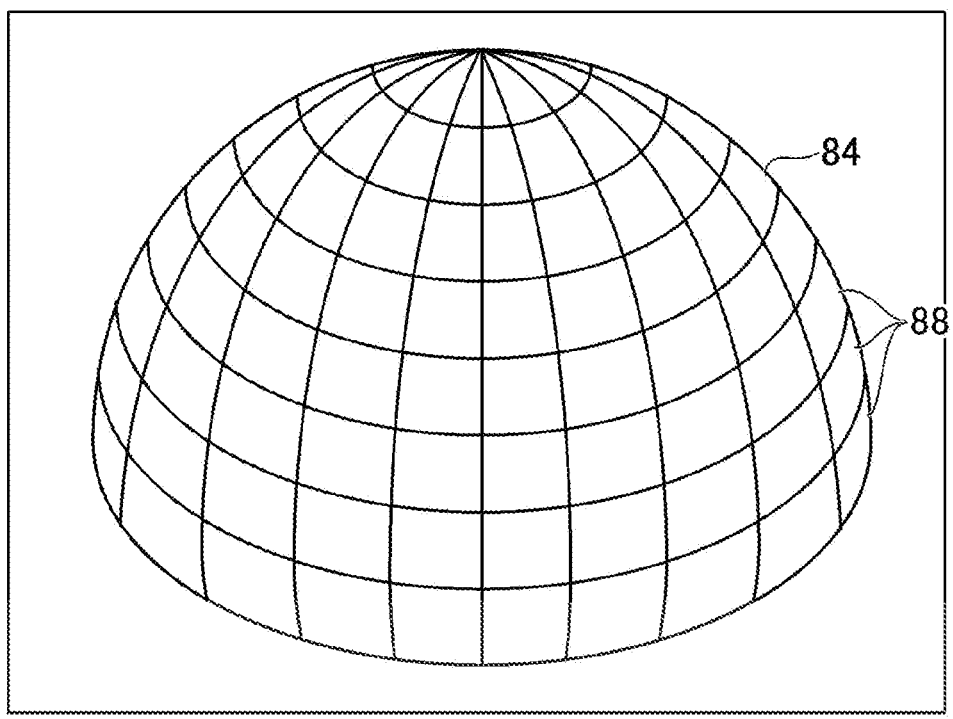
FIG. 7 is a diagram illustrating an example of an AR image.

In the present embodiment, for example, the virtual space managing section 70 generates, in an initial state, the virtual space 86 in which the virtual object 84 is disposed such that the color of all of the photographing posture range objects 88 is a predetermined opaque color (for example, a light blue). Incidentally, the photographing posture range objects 88 may be translucent rather than being opaque. FIG. 7 illustrates an example of the AR image displayed in the initial state.

Figure 8:
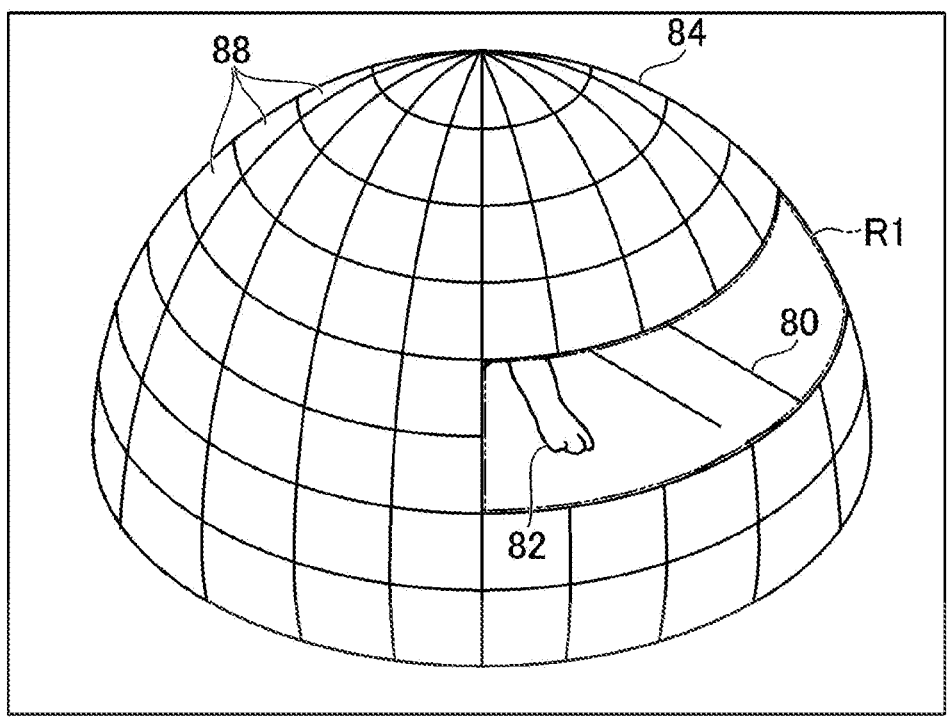
FIG. 8 is a diagram illustrating an example of an AR image.

Further, the virtual space managing section 70 updates, to transparency, a photographing posture range object 88 in a predetermined opaque or translucent color, the photographing posture range object 88 corresponding to a photographing posture range in which a predetermined number of positive example sample images or more are obtained. FIG. 8 illustrates an example of the AR image displayed when 10 photographing posture range objects 88 occupying a region R1 are updated from being opaque to transparent.

Figure 9:
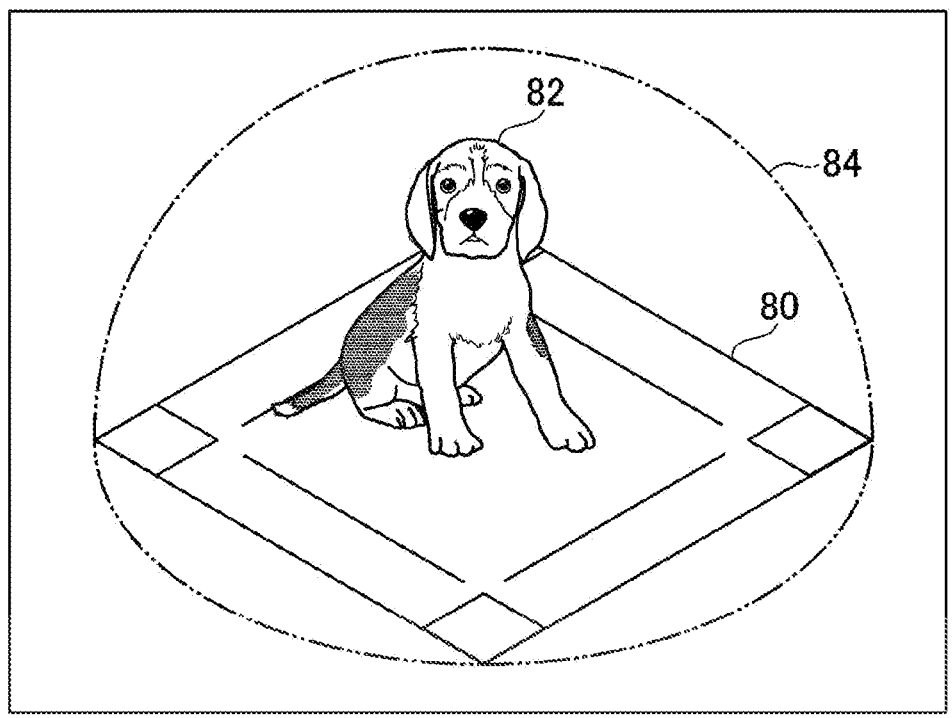
FIG. 9 is a diagram illustrating an example of an AR image.

Further, when a predetermined number of positive example sample images or more are obtained for all of the photographing posture ranges, all of the photographing posture range objects 88 are set to be transparent. FIG. 9 illustrates an example of the AR image displayed when all of the photographing posture range objects 88 are set to be transparent. When all of the photographing posture range objects 88 are set transparent, the photographing necessity/unnecessity determining section 68 determines, for each of the plurality of photographing posture ranges, the necessity/unnecessity of additional photographing of the sample 82 in the photographing posture range.

Here, suppose that additional photographing of the sample 82 is determined to be unnecessary for all of the photographing posture ranges. In this case, the notifying section 72, for example, notifies the user by display, audio output, or the like that sufficient photographing of the sample 82 for ensuring a discrimination accuracy of the discriminator 30 has been performed.

Figures 10, 11:
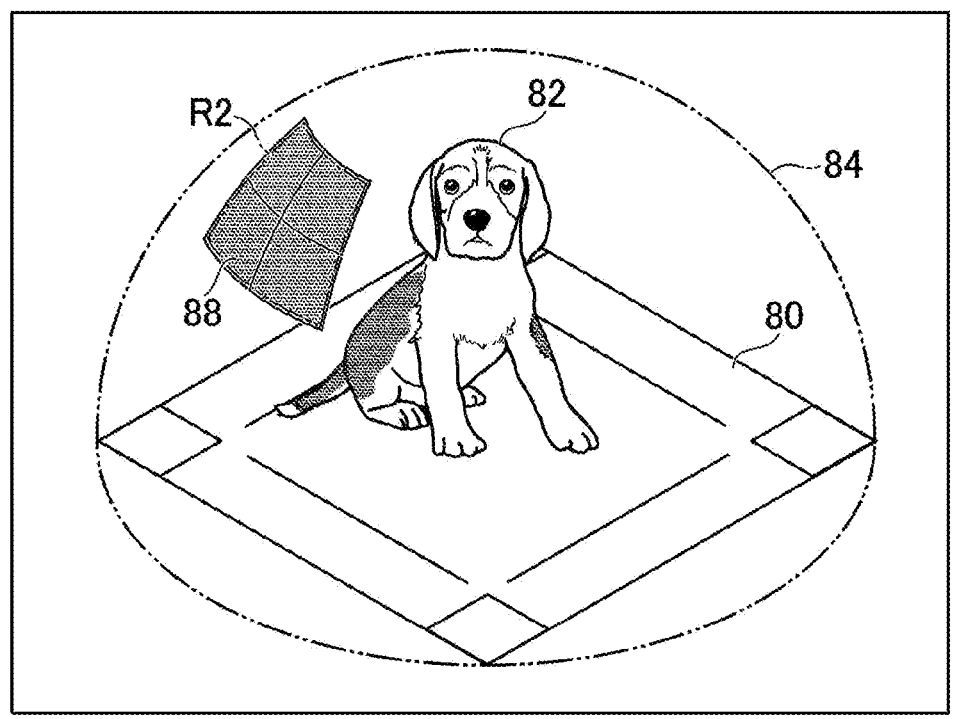
FIG. 10 is a diagram illustrating an example of an AR image.
FIG. 11 is a diagram illustrating an example of region management data.
Figure 12A:
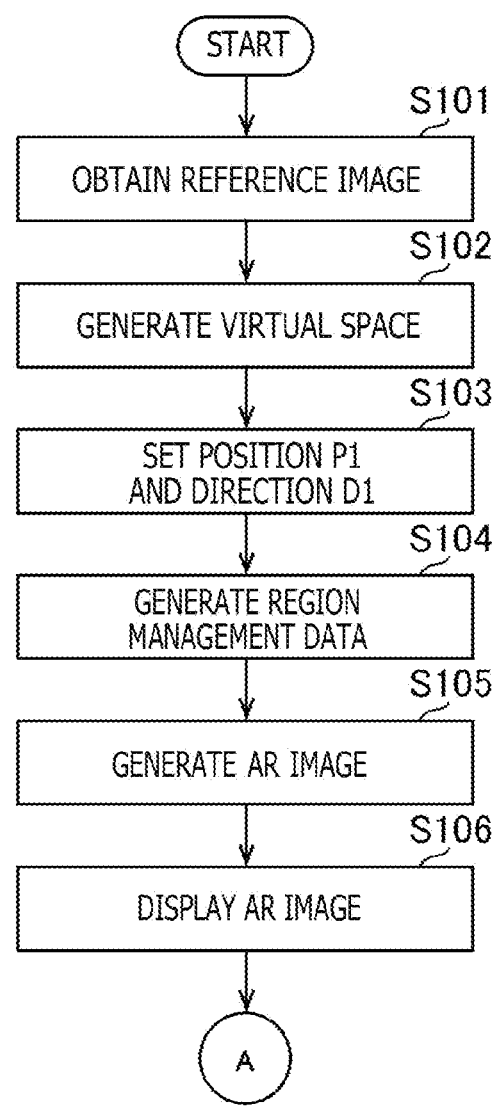
FIG. 12A is a flowchart illustrating an example of a flow of processing performed in the information processing apparatus according to one embodiment of the present invention.
Figure 12B:
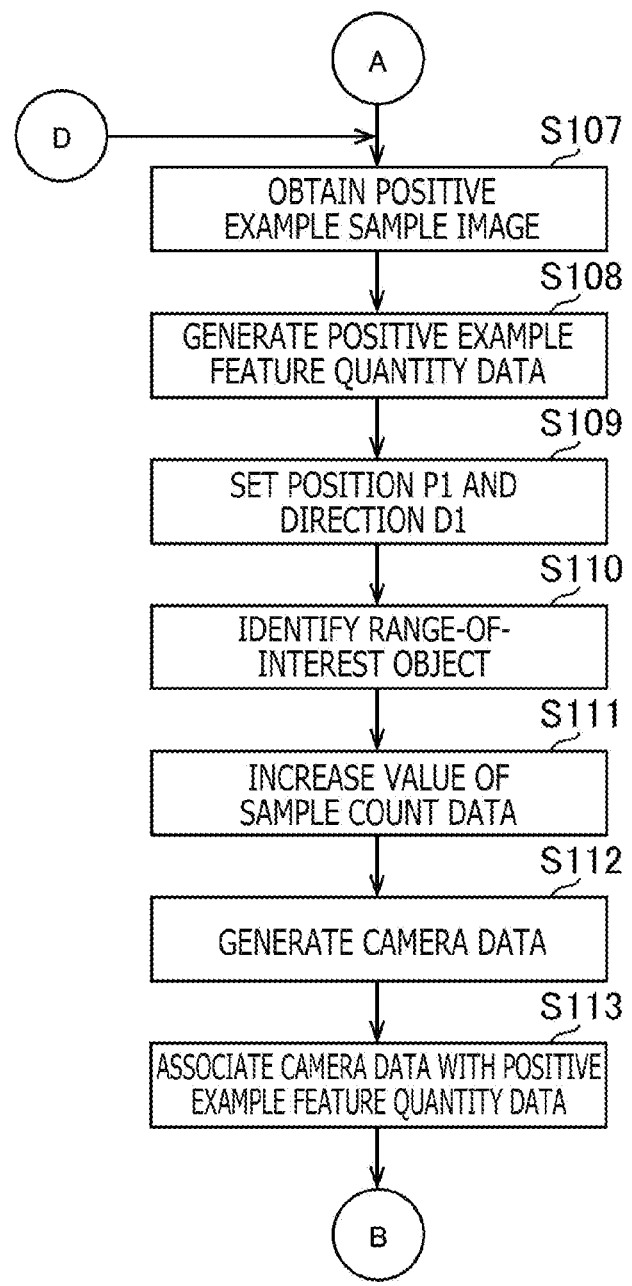
FIG. 12B is a flowchart illustrating an example of a flow of processing performed in the information processing apparatus according to one embodiment of the present invention.
Figure 12C:
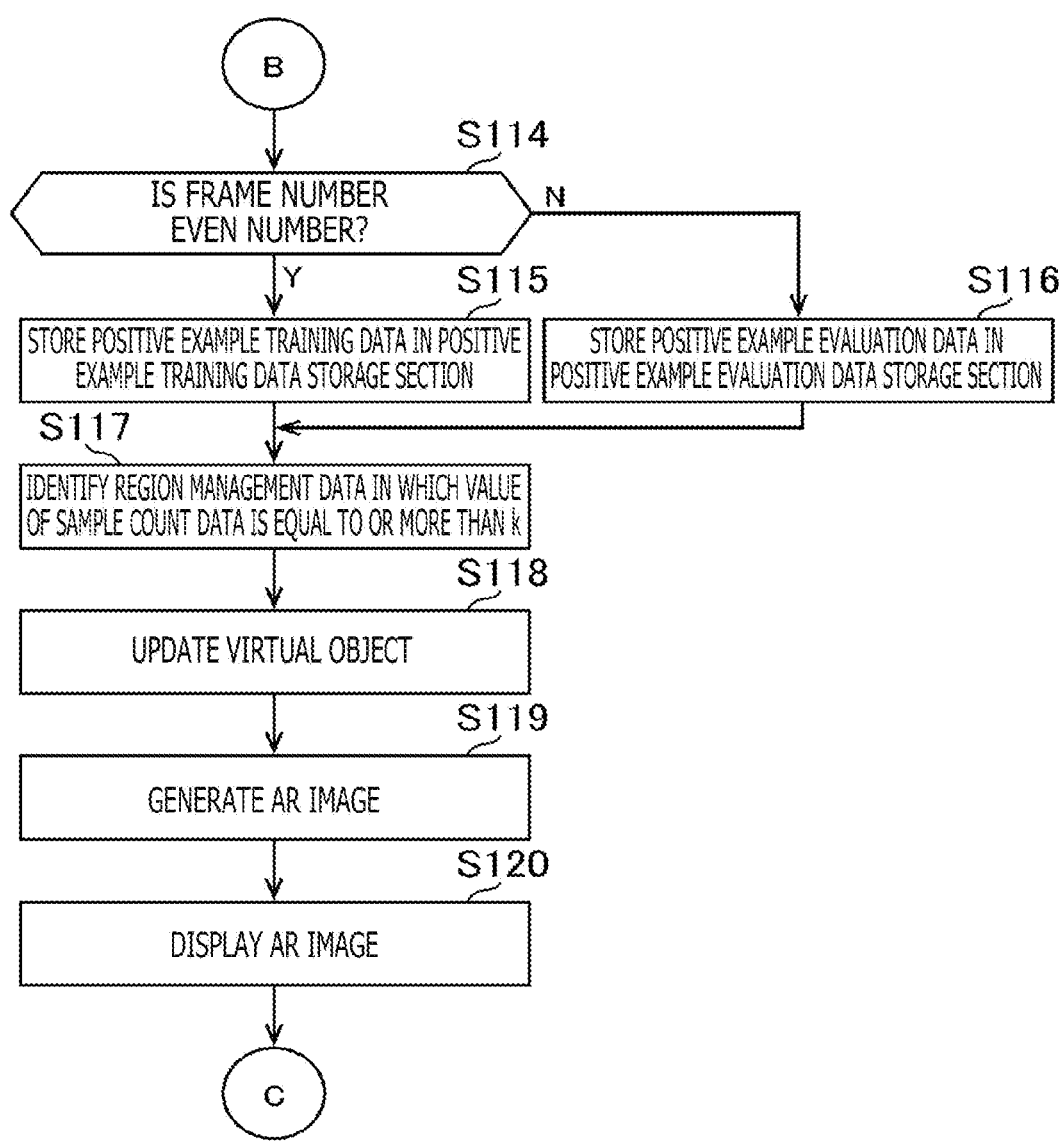
FIG. 12C is a flowchart illustrating an example of a flow of processing performed in the information processing apparatus according to one embodiment of the present invention.
Figure 12D:
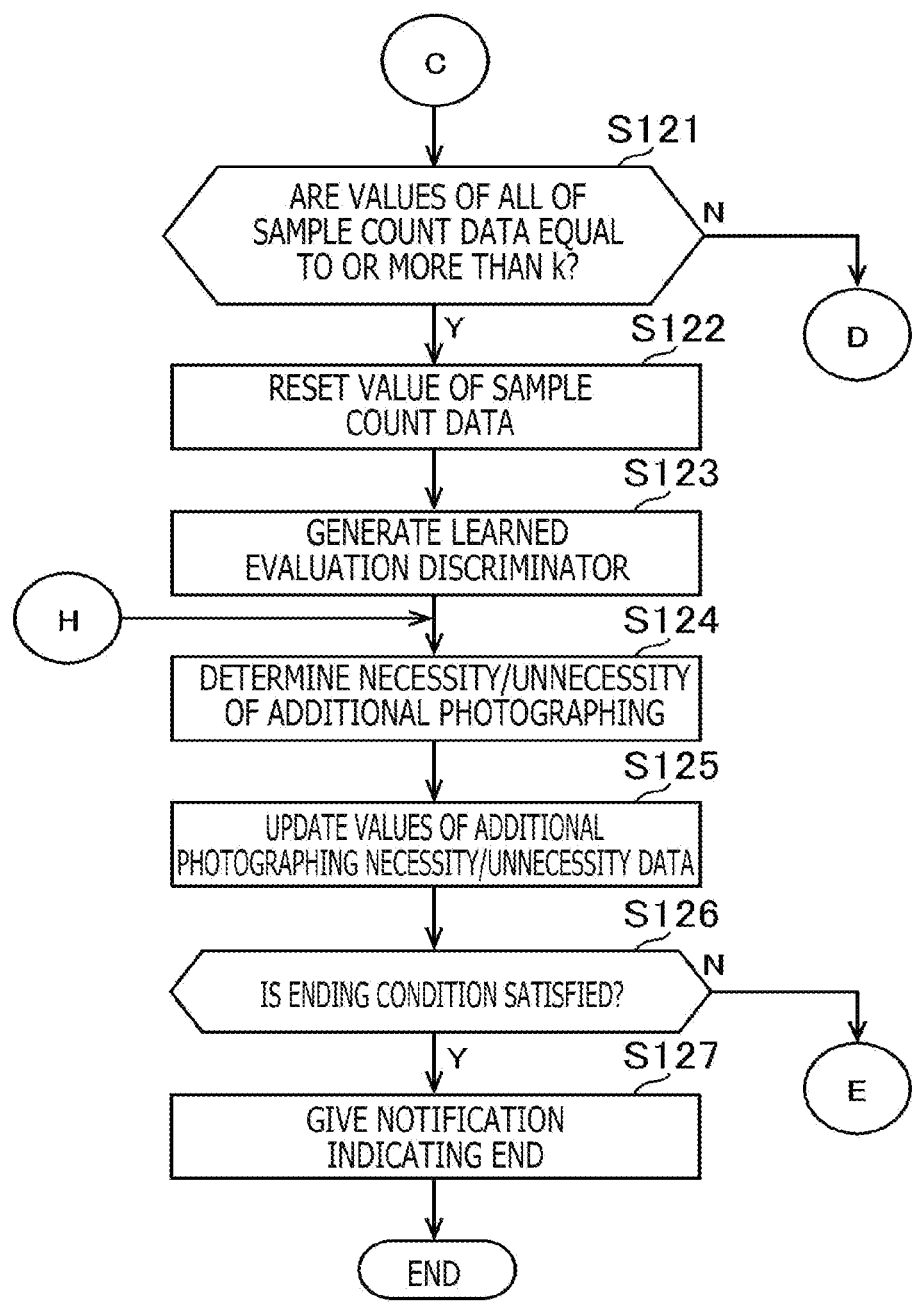
FIG. 12D is a flowchart illustrating an example of a flow of processing performed in the information processing apparatus according to one embodiment of the present invention.
Figure 12E:
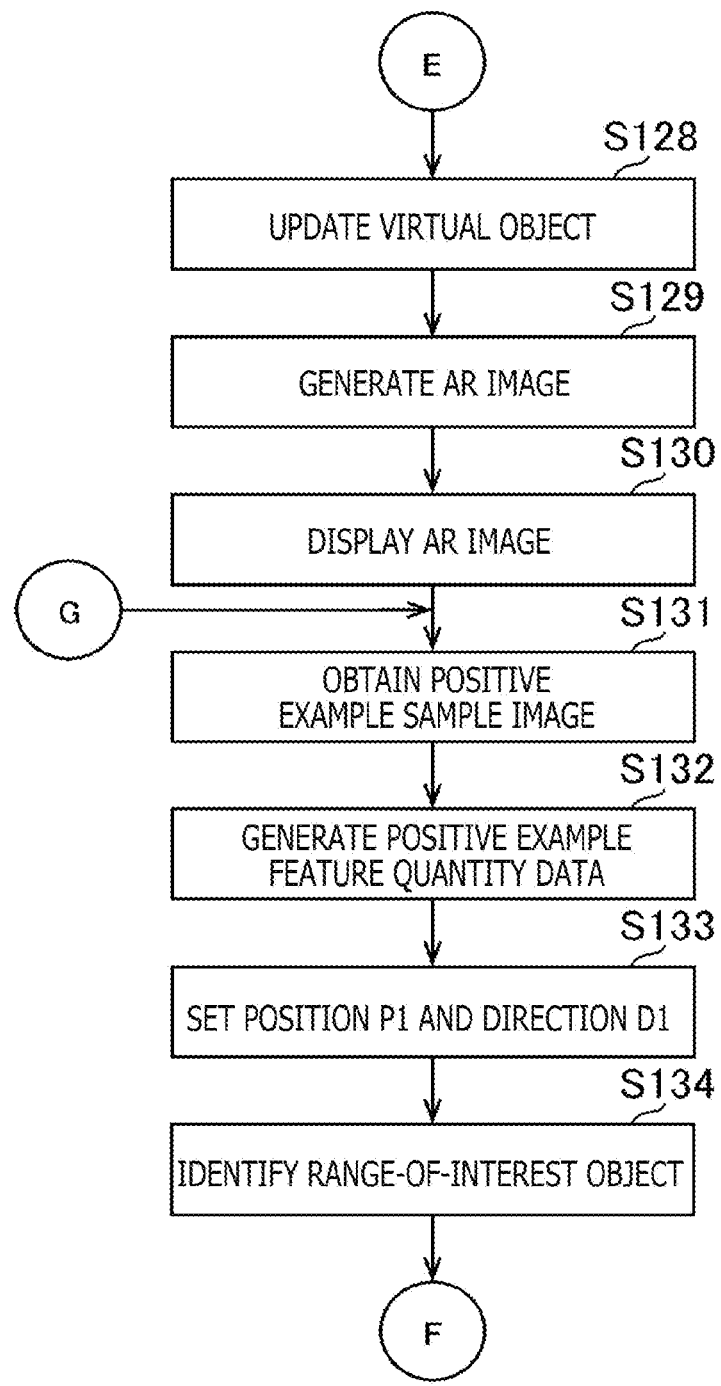
FIG. 12E is a flowchart illustrating an example of a flow of processing performed in the information processing apparatus according to one embodiment of the present invention.

On the other hand, suppose that there is one or a plurality of photographing posture ranges for which additional photographing of the sample 82 is determined to be necessary. In this case, the virtual space managing section 70 updates the color of a photographing posture range object 88 corresponding to each of the one or plurality of photographing posture ranges to a predetermined opaque or translucent color (for example, red). Further, the virtual space managing section 70 generates an AR image obtained by superimposing on each other an image representing a view of the virtual space 86 in which the post-update photographing posture range object 88 is disposed and the sample image photographed by the photographing unit 20. Then, the notifying section 72 causes the AR image to be displayed. FIG. 10 illustrates an example of the AR image displayed when four photographing posture range objects 88 occupying a region R2 are updated to be red. In FIG. 10, the four photographing posture range objects 88 updated to be red are represented by dots.

The notifying section 72 according to the present embodiment, for example, thus notifies the user of the photographing posture ranges in which additional photographing is necessary.

Further, in the present embodiment, in reference to sample images photographed additionally in the photographing posture ranges for which additional photographing of the sample 82 has been determined to be necessary, the feature quantity extracting section 64 generates additional positive example training data as positive example feature quantity data corresponding to the sample images.

Further, the evaluation learning section 66 updates the evaluation discriminator 60 by performing learning using the additional positive example training data.

Until additional photographing of the sample 82 is determined to be unnecessary, the information processing apparatus 10 according to the present embodiment repeats the generation of additional positive example training data by the feature quantity extracting section 64, the updating of the evaluation discriminator 60 by the evaluation learning section 66, and the determination of the necessity/unnecessity of additional photographing of the sample 82 by the photographing necessity/unnecessity determining section 68.

FIG. 11 is a diagram illustrating an example of region management data retained by the virtual space managing section 70 according to the present embodiment. The region management data is data associated with the photographing posture range objects 88. As illustrated in FIG. 11, the region management data, for example, includes a region ID, a sample count data, and additional photographing necessity/unnecessity data.

The region ID included in the region management data is, for example, an identifier of a photographing posture range object 88 associated with the corresponding region management data. The sample count data included in the region management data is, for example, data indicating the number of positive example sample images obtained in a photographing posture range associated with the corresponding region management data. The additional photographing necessity/unnecessity data included in the region management data is, for example, data indicating whether or not additional photographing of the sample 82 in the photographing posture range associated with the corresponding region management data is determined to be necessary. In the present embodiment, an initial value of the additional photographing necessity/unnecessity data is, for example, 0. Then, in the present embodiment, 1 is, for example, set as the value of the additional photographing necessity/unnecessity data of the region management data associated with a photographing posture range in which additional photographing of the sample 82 is determined to be necessary.

In the present embodiment, the virtual space managing section 70 may determine the color of each of the plurality of photographing posture range objects 88 in reference to the region management data.

Here, with reference to a flowchart illustrated in FIGS. 12A to 12F, description will be made of an example of a flow of processing from a start of the photographing of the sample 82 to giving a notification to the user that sufficient photographing of the sample 82 has been performed, the processing being performed in the information processing apparatus 10 according to the present embodiment. Incidentally, in the processing example illustrated in the following, suppose that the user photographs a moving image of the sample 82 from various angles while moving the photographing unit 20. Further, suppose that the photographing unit 20 generates frame images of the sample 82 at a predetermined frame rate. In addition, suppose that a plurality of pieces of negative example training data are stored in the negative example training data storage section 52 in advance and that a plurality of pieces of negative example evaluation data are stored in the negative example evaluation data storage section 56 in advance.

First, the sample image obtaining section 62 obtains a reference image to be used for an initial setting of the virtual space 86, the reference image being an image obtained by photographing the sample 82 by the photographing unit 20 (S101).

Then, the virtual space managing section 70 generates the virtual space 86 in which the virtual object 84 is disposed such that the color of all of the photographing posture range objects 88 is set to a predetermined opaque or translucent color (for example, light blue) (S102). Suppose that the photographing posture range objects 88 in the present processing example are objects associated with respective regions obtained by dividing the hemispherical surface of the virtual object 84 into N parts according to a predetermined rule.

Then, the virtual space managing section 70 identifies the position P1 corresponding to the photographing position of the sample 82 and the direction D1 corresponding to the photographing direction of the sample 82, in reference to the reference image obtained by the processing illustrated in S101, and sets the position P1 and the direction D1 in the virtual space 86 (S103). Here, for example, the position P1 and the direction D1 are identified according to the shape and size of the AR marker 80 appearing in the reference image.

Then, the virtual space managing section 70 generates and retains N pieces of region management data respectively associated with the photographing posture range objects 88 (S104). Values of 1 to N are set as respective region IDs of the N pieces of region management data. In addition, for all of the N pieces of region management data, 0 is set as the values of sample count data and the values of additional photographing necessity/unnecessity data.

Then, the virtual space managing section 70 generates an AR image obtained by superimposing on each other the reference image obtained by the processing illustrated in S101 and an image representing a state of the virtual space 86 viewed in the direction D1 from the position P1 set by the processing illustrated in S103 (S105).

Then, the notifying section 72 makes the display unit 18 display the AR image generated by the processing illustrated in S105 (S106). Here, for example, the AR image illustrated in FIG. 7 is displayed.

Then, the sample image obtaining section 62 obtains a positive example sample image as an image newly obtained by photographing the sample 82 by the photographing unit 20 (S107).

Then, in reference to the positive example sample image obtained by the processing illustrated in S107, the feature quantity extracting section 64 generates positive example feature quantity data indicating a feature quantity corresponding to the positive example sample image (S108).

Then, the virtual space managing section 70 identifies the position P1 corresponding to the photographing position of the sample 82 and the direction D1 corresponding to the photographing direction of the sample 82, in reference to the positive example sample image obtained by the processing illustrated in S107, and sets the position P1 and the direction D1 in the virtual space 86 (S109). Here, for example, the position P1 and the direction D1 are identified according to the shape and size of the AR marker 80 appearing in the positive example sample image.

Then, the virtual space managing section 70 identifies a range-of-interest object 88a as a photographing posture range object 88 intersecting a line along the direction D1 set by the processing illustrated in S109 which passes through the position P1 set by the processing illustrated in S109 (S110).

Then, the virtual space managing section 70 increments, by 1, the value of the sample count data of region management data corresponding to the range-of-interest object 88a identified by the processing illustrated in S110 (S111).

Then, the feature quantity extracting section 64 generates camera data associated with the photographing position and photographing direction of the positive example sample image obtained by the processing illustrated in S107 (S112). Here, for example, camera data indicating a region ID corresponding to the range-of-interest object 88a identified by the processing illustrated in S110 or camera data indicating the position P1 and the direction D1 set by the processing illustrated in S109 may be generated.

Then, the feature quantity extracting section 64 associates the camera data generated by the processing illustrated in S112 with the positive example feature quantity data generated by the processing illustrated in S108 (S113).

Then, the feature quantity extracting section 64 checks whether or not the frame number of the positive example sample image obtained by the processing illustrated in S107 is an even number (S114).

In a case of an even number (S114: Y), the feature quantity extracting section 64 makes the positive example training data storage section 50 store, as positive example training data, the positive example feature quantity data with which the camera data is associated by the processing illustrated in S113 (S115).

In a case of an odd number (S114: N), the feature quantity extracting section 64 makes the positive example evaluation data storage section 54 store, as positive example evaluation data, the positive example feature quantity data with which the camera data is associated by the processing illustrated in S113 (S116).

When the processing illustrated in S115 or S116 is completed, the virtual space managing section 70 identifies region management data in which the value of the sample count data is equal to or more than a predetermined value k (S117).

Then, the virtual space managing section 70 updates the virtual object 84 such that a photographing posture range object 88 corresponding to the region management data identified by the processing illustrated in S117 becomes transparent (S118).

Then, the virtual space managing section 70 generates an AR image obtained by superimposing on each other the positive example sample image obtained by the processing illustrated in S107 and an image representing a state of the virtual space 86 viewed in the direction D1 from the position P1 set by the processing illustrated in S109 (S119).

Then, the notifying section 72 makes the display unit 18 display the AR image generated by the processing illustrated in S119 (S120).

Then, the virtual space managing section 70 checks whether or not the values of the sample count data in all of the N pieces of region management data are equal to or more than k (S121).

In a case where the values of the sample count data are not equal to or more than k in all of the N pieces of region management data (S121: N), a return is made to the processing illustrated in S107.

In a case where the values of the sample count data are equal to or more than k in all of the N pieces of region management data (S121: Y), the values of the sample count data in all of the N pieces of region management data are reset to 0 (S122).

Then, the evaluation learning section 66 generates the evaluation discriminator 60 that has been made to learn the plurality of pieces of positive example training data stored in the positive example training data storage section 50, as positive examples, and the plurality of pieces of negative example training data stored in the negative example training data storage section 52 as negative examples (S123).

Then, by using the evaluation discriminator 60 learned by the processing illustrated in S123, the photographing necessity/unnecessity determining section 68 determines, for each of the plurality of photographing posture ranges, the necessity/unnecessity of additional photographing of the sample 82 in the photographing posture range (S124).

Here, for example, for each of the plurality of photographing posture ranges, a plurality of pieces of positive example evaluation data associated with camera data corresponding to the photographing posture range are identified from the pieces of positive example evaluation data stored in the positive example evaluation data storage section 54.

Then, the following are identified: the number TP of pieces of positive example evaluation data whose discrimination score values, which are output at a time of input of the positive example evaluation data to the learned evaluation discriminator 60, are equal to or more than a predetermined value among the identified plurality of pieces of positive example evaluation data; and the number FP of pieces of positive example evaluation data whose discrimination score values are less than the predetermined value among the identified plurality of pieces of positive example evaluation data.

In addition, the following are identified: the number TN of pieces of negative example evaluation data whose discrimination score values, which are output at a time of input of the negative example evaluation data to the learned evaluation discriminator 60, are less than the predetermined value among the pieces of negative example evaluation data stored in the negative example evaluation data storage section 56; and the number FN of pieces of negative example evaluation data whose discrimination score values are equal to or more than the predetermined value among the pieces of negative example evaluation data stored in the negative example evaluation data storage section 56.

Then, the value of TP/(TP+FP) is calculated as a precision, and the value of TP/(TP+FN) is calculated as a recall. Further, the value of (2×Precision×Recall)/(Precision+Recall) is calculated as an F-measure.

The F-measure is thus calculated for each of the plurality of photographing posture ranges. Then, additional photographing is determined to be unnecessary for photographing posture ranges whose calculated F-measures are equal to or more than a predetermined value, and additional photographing is determined to be necessary for the other photographing posture ranges. Incidentally, while the F-measure is used as an example of a performance index indicating a level of discrimination accuracy of the evaluation discriminator 60 in the present embodiment, an index other than the F-measure may be used as the performance index indicating the level of discrimination accuracy of the evaluation discriminator 60.

Then, the photographing necessity/unnecessity determining section 68 updates the values of the additional photographing necessity/unnecessity data of the region management data (S125). In the processing illustrated in S125, for example, 1 is set as the value of the additional photographing necessity/unnecessity data of region management data corresponding to a photographing posture range for which additional photographing is determined to be necessary. In addition, 0 is set as the value of the additional photographing necessity/unnecessity data of region management data corresponding to a photographing posture range for which additional photographing is determined to be unnecessary.

Then, the virtual space managing section 70 determines whether or not a predetermined ending condition is satisfied (S126). Here, for example, the predetermined ending condition is determined to be satisfied in a case where either a condition (1) or a condition (2) in the following is satisfied for all of the photographing posture ranges. The condition (1) includes a sufficient discrimination accuracy of the learned evaluation discriminator 60 (for example, the values of the additional photographing necessity/unnecessity data of the corresponding region management data are 0) and the like. The condition (2) includes a low improvement rate of performance of the learned evaluation discriminator 60 (for example, a value obtained by subtracting an F-measure calculated last time from an F-measure calculated this time is less than a predetermined value) and the like.

In a case where the predetermined ending condition is determined to be satisfied (S126: Y), a notification indicating an end of the photographing of the sample 82 is given to the user by, for example, display, audio output, or the like (S127). The processing illustrated in the present processing example is then ended.

In a case where the predetermined ending condition is determined not to be satisfied (S126: N), the virtual space managing section 70 updates the virtual object 84 such that the photographing posture range object(s) 88 corresponding to region management data in which the value of the additional photographing necessity/unnecessity data is 1 become(s) red (S128).

Then, the virtual space managing section 70 generates an AR image obtained by superimposing on each other the latest positive example sample image and an image representing a state of the virtual space 86 viewed in the latest direction D1 from the latest position P1 (S129).

Then, the notifying section 72 makes the display unit 18 display the AR image generated by the processing illustrated in S129 (S130).

Then, the sample image obtaining section 62 obtains a positive example sample image as an image newly obtained by photographing the sample 82 by the photographing unit 20 (S131).

Then, in reference to the positive example sample image obtained by the processing illustrated in S131, the feature quantity extracting section 64 generates positive example feature quantity data indicating a feature quantity corresponding to the positive example sample image (S132).

Then, the virtual space managing section 70 identifies the position P1 corresponding to the photographing position of the sample 82 and the direction D1 corresponding to the photographing direction of the sample 82, in reference to the positive example sample image obtained by the processing illustrated in S131, and sets the position P1 and the direction D1 in the virtual space 86 (S133).

Then, the virtual space managing section 70 identifies a range-of-interest object 88a as a photographing posture range object 88 intersecting a line along the direction D1 set by the processing illustrated in S133 which passes through the position P1 set by the processing illustrated in S133 (S134).

Then, the virtual space managing section 70 checks whether or not the value of the additional photographing necessity/unnecessity data of region management data corresponding to the range-of-interest object 88a identified by the processing illustrated in S134 is 1 (S135).

In a case of 1 (S135: Y), the virtual space managing section 70 increments, by 1, the value of the sample count data of the region management data corresponding to the range-of-interest object 88a identified by the processing illustrated in S134 (S136).

Then, the feature quantity extracting section 64 generates camera data associated with the photographing position and photographing direction of the positive example sample image obtained by the processing illustrated in S131 (S137).

Then, the feature quantity extracting section 64 associates the camera data generated by the processing illustrated in S137 with the positive example feature quantity data generated by the processing illustrated in S132 (S138).

Then, the feature quantity extracting section 64 makes the positive example training data storage section 50 store, as positive example training data, the positive example feature quantity data with which the camera data is associated by the processing illustrated in S138 (S139).

Then, the virtual space managing section 70 checks whether or not the value of the sample count data of the region management data corresponding to the range-of-interest object 88a identified by the processing illustrated in S134 has reached a predetermined value L (S140).

Suppose that the value of the sample count data has reached L (S140: Y). In this case, the evaluation learning section 66 generates the evaluation discriminator 60 that has been made to learn the plurality of pieces of positive example training data stored in the positive example training data storage section 50, as positive examples, and the plurality of pieces of negative example training data stored in the negative example training data storage section 52, as negative examples (S141). Then, a return is made to the processing illustrated in S124. Here, the evaluation learning section 66 may update the learned evaluation discriminator 60 by making the evaluation discriminator 60 additionally learn positive example training data additionally stored in the positive example training data storage section 50.

Suppose that the value of the sample count data has not reached L (S140: N). In this case, the virtual space managing section 70 generates an AR image obtained by superimposing on each other the latest positive example sample image and an image representing a state of the virtual space 86 viewed in the latest direction D1 from the latest position P1 (S142). Also in a case where it is confirmed by the processing illustrated in S135 that the value of the additional photographing necessity/unnecessity data is 0 (S135: N), the virtual space managing section 70 generates a similar AR image (S142).

Then, the notifying section 72 makes the display unit 18 display the AR image generated by the processing illustrated in S142 (S143). A return is then made to the processing illustrated in S131.

The learning section 38 makes the discriminator 30 learn the positive example training data ultimately stored in the positive example training data storage section 50 and the negative example training data ultimately stored in the negative example training data storage section 52 by the processing illustrated in FIGS. 12A to 12F.

In the present embodiment, the user is notified of the necessity/unnecessity of additional photographing of the sample 82 which is determined according to a result of evaluating, in reference to evaluation data, the evaluation discriminator 60 that has learned the training data. Hence, according to the present embodiment, the user can accurately recognize that a sufficient number of samples 82 for the learning of the discriminator 30 have been collected. As a result, efficiency of collection of training data can be enhanced.

In addition, in the present embodiment, the photographing direction of the sample 82 from which additional photographing is necessary is visually transmitted to the user by an AR image. Hence, according to the present embodiment, the user can accurately recognize the photographing direction from which the photographing of the sample 82 needs to be performed. As a result, efficiency of collection of training data can be enhanced.

It is to be noted that the present invention is not limited to the foregoing embodiment.

For example, the discriminator 30 and the evaluation discriminator 60 may be an SVM of any kernel. In addition, the discriminator 30 and the evaluation discriminator 60 may be a discriminator using such a method as a K-nearest neighbor algorithm, logistic regression, or a boosting method such as AdaBoost. In addition, the discriminator 30 and the evaluation discriminator 60 may be implemented by a neural network, a naive Bayes classifier, a random forest, a decision tree, or the like. In addition, the classification classes of the discriminator 30 and the evaluation discriminator 60 do not need to be two classes, and the discriminator 30 and the evaluation discriminator 60 may be capable of classification into three classes or more (that is, there may be a plurality of positive classes different from each other).

In addition, the discriminator 30 and the evaluation discriminator 60 may output a binary discrimination score indicating whether or not an object appearing in an input image belongs to the positive class.

In addition, without the use of the AR marker 80, the photographing position and the photographing direction may be identified according to a result of measurement by such a sensor as a gyro sensor or an inertial sensor included in the photographing unit 20. In addition, the position P1 and the direction D1 may be identified according to the photographing position and the photographing direction thus identified.

In addition, a plurality of regions may be extracted from an input image, and for each of the regions, the estimating section 44 may estimate whether or not an object appearing in an image of the region belongs to the positive class.

In addition, the above-described method is applicable also to a situation in which negative example training data is generated in reference to negative example sample images obtained by photographing a negative example sample and the generated plurality of pieces of negative example training data are stored in the negative example training data storage section 52.

In addition, specific character strings and numerical values in the above description and specific character strings and numerical values in the drawings are illustrative, and are not limited to these character strings and numerical values.

The invention claimed is:

1. An additional photographing necessity or unnecessity notifying apparatus comprising:
   a sample image obtaining unit implemented by way of a computer processor and operating to repetitively obtain a sample image generated by photographing a given sample by a photographing unit;
   a feature quantity data generating unit implemented by way of the computer processor and operating to generate feature quantity data corresponding to the sample image, in reference to the sample image;
   a classifying unit implemented by way of the computer processor and operating to classify each of a plurality of pieces of the feature quantity data into either training data or evaluation data;
   a learning unit implemented by way of the computer processor and operating to perform machine learning of a discriminator by using a plurality of pieces of the training data;
   a photographing necessity or unnecessity determining unit implemented by way of the computer processor and operating to determine necessity or unnecessity of additional photographing of the sample by using the discriminator in which the machine learning using the plurality of pieces of the training data has already been performed and a plurality of pieces of the evaluation data; and
   a notifying unit implemented by way of the computer processor and operating to give a notification regarding a result of the determination of the necessity or unnecessity, wherein:
   for each of a plurality of photographing posture ranges with respect to the sample determined in advance, the photographing necessity or unnecessity determining unit determines the necessity or unnecessity of additional photographing of the sample in the photographing posture range by using the evaluation data corresponding to the sample image photographed in the photographing posture range, and
   the notifying unit gives a notification regarding results of the determination of the necessity or unnecessity in the plurality of the photographing posture ranges.

2. The additional photographing necessity or unnecessity notifying apparatus according to claim 1, wherein,
   in reference to a sample image photographed additionally in a photographing posture range for which additional photographing of the sample is determined to be necessary, the feature quantity data generating unit generates additional training data as feature quantity data corresponding to the sample image, and
   the learning unit updates the discriminator by performing machine learning using the additional training data.

3. The additional photographing necessity or unnecessity notifying apparatus according to claim 2, wherein the additional photographing necessity or unnecessity notifying apparatus repeats the generation of the additional training data by the feature quantity data generating unit, the updating of the discriminator by the learning unit, and the determination of the necessity or unnecessity of additional photographing of the sample by the photographing necessity or unnecessity determining unit until the additional photographing of the sample is determined to be unnecessary.

4. The additional photographing necessity or unnecessity notifying apparatus according to claim 1, further comprising:
   a virtual space generating unit implemented by way of the computer processor and operating to generate a virtual space in which a virtual object is disposed, the virtual object representing the result of the determination of the necessity or unnecessity in each of the plurality of the photographing posture ranges; and
   an augmented reality image generating unit implemented by way of the computer processor and operating to generate an augmented reality image obtained by superimposing on each other the sample image and an image representing a view in a direction in the virtual space, the direction corresponding to a photographing direction of the sample image, from a position within the virtual space, the position corresponding to a photographing position of the sample image, wherein
   the notifying unit causes the augmented reality image to be displayed on a screen.

5. An additional photographing necessity or unnecessity notifying method comprising:
   repetitively obtaining a sample image generated by photographing a given sample by a photographing unit;
   generating feature quantity data corresponding to the sample image, in reference to the sample image;
   classifying each of a plurality of pieces of the feature quantity data into either training data or evaluation data;
   performing machine learning of a discriminator by using a plurality of pieces of the training data;
   determining necessity or unnecessity of additional photographing of the sample by using the discriminator in which the machine learning using the plurality of pieces of the training data has already been performed and a plurality of pieces of the evaluation data; and
   giving a notification regarding a result of the determination of the necessity or unnecessity, wherein:
   for each of a plurality of photographing posture ranges with respect to the sample determined in advance, the determining includes determining the necessity or unnecessity of additional photographing of the sample in the photographing posture range by using the evaluation data corresponding to the sample image photographed in the photographing posture range, and
   the notifying includes giving a notification regarding results of the determination of the necessity or unnecessity in the plurality of the photographing posture ranges.

6. A non-transitory, computer readable storage medium containing a computer program, which when executed by a computer, causes the computer to perform a method by carrying out actions, comprising:
   repetitively obtaining a sample image generated by photographing a given sample by a photographing unit;
   generating feature quantity data corresponding to the sample image, in reference to the sample image;
   classifying each of a plurality of pieces of the feature quantity data into either training data or evaluation data;
   performing machine learning of a discriminator by using a plurality of pieces of the training data;
   determining necessity or unnecessity of additional photographing of the sample by using the discriminator in which the machine learning using the plurality of pieces of the training data has already been performed and a plurality of pieces of the evaluation data; and giving a notification regarding a result of the determination of the necessity or unnecessity, wherein:

for each of a plurality of photographing posture ranges with respect to the sample determined in advance, the determining includes determining the necessity or unnecessity of additional photographing of the sample in the photographing posture range by using the evaluation data corresponding to the sample image photographed in the photographing posture range, and the notifying includes giving a notification regarding results of the determination of the necessity or unnecessity in the plurality of the photographing posture ranges.

\* \* \* \* \*